United States Patent [19]
Hallas et al.

[11] 3,884,902
[45] May 20, 1975

[54] SULFONYL DERIVATIVES OF ERYTHROMYCIN

[75] Inventors: Robert Hallas; Jerry Roy Martin, both of Waukegan; John Soloman, Chicago, all of Ill.

[73] Assignee: Abbott Laboratories, North Chicago, Ill.

[22] Filed: May 4, 1973

[21] Appl. No.: 357,124

[52] U.S. Cl. .............................. 260/210 E; 424/180
[51] Int. Cl. .......................................... C07c 129/18
[58] Field of Search ................... 260/210 E, 210 AB

[56] References Cited
UNITED STATES PATENTS
3,000,874   9/1961   Bray et al. ........................ 260/210 E Primary Examiner—Johnnie R. Brown
Assistant Examiner—Cary B. Owens
Attorney, Agent, or Firm—Robert L. Niblack; James L. Bailey; Vincent A. Mallare

[57] ABSTRACT

Covers erythromycin sulfonyl derivatives which are useful as antibiotics when administered to warm blooded animals.

24 Claims, No Drawings

SULFONYL DERIVATIVES OF ERYTHROMYCIN

DESCRIPTION OF THE INVENTION

This invention relates to derivatives of erythromycin and more particularly to 4''-O-sulfonyl derivatives of erythromycin A, B and C. The novel compounds of this invention have the following structural formula:

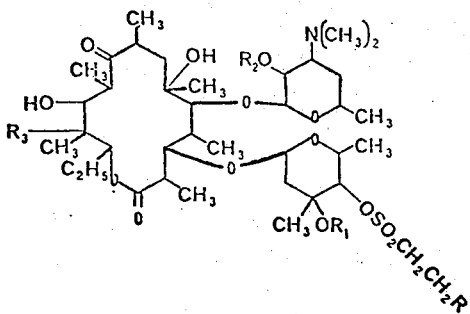

wherein R is selected from the group consisting of amino, monoalkyl amino, dialkyl amino, alkoxy, morpholino, substituted morpholino, piperazino, substituted piperazino, piperidino, substituted piperidino, alkylthio, alkylsulfonyl, arylthio, substituted arylthio, arylsulfonyl, substituted arylsulfonyl, thiamorpholino, aziridino, substituted aziridino, benzylthio, substituted benzylthio, thiamorpholinosulfone, substituted thiamorpholinosulfone, benzylsulfinyl, substituted benzylsulfinyl, arylsulfinyl, substituted arylsulfinyl, benzylsulfonyl, substituted benzylsulfonyl, haloalkyl, cyanoalkyl, halocyanoalkyl, haloalkanoate, dialkanoate, detoalkyl, ketoalkanoate, benzylamino, substituted benzylamino, benzoxy, substituted benzoxy, benzylcyano, and substituted benzylcyano; $R_1$ is hydrogen or methyl, $R_2$ is hydrogen or loweralkanoyl, and $R_3$ is hydrogen or hydroxy.

Erythromycin is produced in three forms denoted A, B and C by cultivating a strain of *Streptomyces erythreus* in a suitable nutrient medium as is taught in U.S. Pat. No. 2,653,899, Bunch, et al. The structure of erythromycin is represented by the following formula:

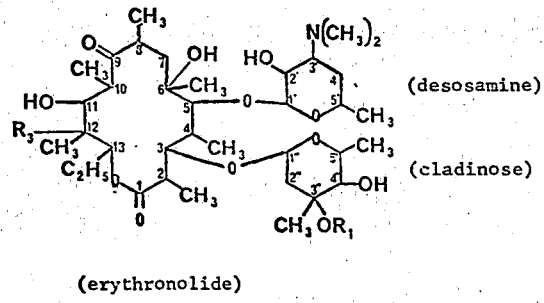

(erythronolide)

In this formula, when $R_1$ is methyl and $R_3$ is hydroxyl, the structure illustrated is erythromycin A. When $R_1$ is methyl and $R_3$ is hydrogen, the structure of erythromycin B is illustrated. When $R_1$ is hydrogen and $R_3$ is hydroxyl, the structure of erythromycin C is illustrated. The term "erythromycin" when used herein without modification is meant to embrace all three forms; that is, erythromycin A, B and C.

Erythromycin, as will be noted from the formula, comprises three cyclic fragments. These fragments are referred to respectively as cladinose, desosamine and erythronolide. The positions on the cladinose ring are indicated by double primed numbers; the positions on the desosamine ring by single primed numbers; while positions on the erythronolide ring are indicated by unprimed numbers.

In general, the compounds of this invention are prepared by reacting a 4''-O-vinylsulfonyl erythromycin with a reactant having a labile hydrogen whereby addition across the erythromycin double bond (4'' vinylsulfonyl group) is effected. The 4''-O-vinylsulfonyl erythromycin is best prepared by following the procedures outlined in commonly assigned application bearing Ser. No. 356,987, filed as of even date and now U.S. Pat. No. 3,855,203. A wide variety of compounds may be reacted with the erythromycin reactant in this well know Michael reaction. For example, aliphatic, aromatic heterocyclic and cyclic amines may be employed. Likewise, aliphatic and aromatic mercaptans may be reacted with the erythromycin. Again, aliphatic and aromatic alcohols may be employed. In some instances the addition products across the vinyl group of the erythromycin may be further modified by various conventional steps. For example, if a mercaptan is reacted with the vinylsulfonyl erythromycin, the resultant thio compound may be oxidized to a sulfinyl or sulfonyl group. Other reactions involving oxidations, reductions, etc. may also be carried out once addition across the vinyl group has been accomplished.

When R in the above formula contains one or more alkyl groups normally the alkyl group is a loweralkyl group containing 1 – 6 carbon atoms, and more often 1 – 4 carbon atoms. When R includes a nitrogen heterocyclic, cyclic or aromatic group, such groups may also contain a wide variety of substituents on the ring. These may include alkyl, cyano, nitro, halo, amino, substituted amino, ester, alkoxy, mercapto, etc. groups. Likewise when R contains one or more alkyl groups the alkyl group may be likewise substituted with the just-mentioned substituents. The alkyl group may be either branched or a straight chain in character.

In addition to the erythromycin reactant being either erythromycin A, B or C, such starting material may also contain an alkanoyl group in the 2'-position. Normally such alkanoyl group contains 1 – 6 carbon atoms, and most often 1 – 4 carbon atoms. Thus, for example, the 2'-position may contain an acetyl, propionyl, butyryl, etc. group. Likewise, such alkanoyl groups may be placed on the molecule after the Michael addition reaction has taken place.

The following examples more clearly illustrate the invention:

EXAMPLE I

4''-O-Vinylsulfonyl Erythromycin A

To a cooling solution of 14.7 g. (0.02 m.) of erythromycin A in 300 ml. of pyridine, 7.3 ml. of 2-bromoethanesulfonyl chloride was added dropwise keeping the internal temperature below 5° C. After the addition, the reaction mixture was stirred in an ice bath for 15 minutes. Thereafter, the reaction mixture was removed from the ice bath and allowed to stir at ambient temperature for 45 minutes. After this period of time, the reaction mixture was poured into two liters of 5% NaHCO$_3$ solution and extracted with 2 × 600 ml. portions of chloroform. The extracts were combined and washed with a 500 ml. portion of 5% NaHCO$_3$ solution. The chloroform layer was dried over MgSO$_4$, filtered and concentrated to leave 16.0 g. of desired product. This material was purified by column chromatography to obtain an analytical sample. The analysis agreed with the desired product. $C_{39}H_{69}NO_{15}S$; M.W. – 824.01

EXAMPLE II

4''-O-Vinylsulfonyl Erythromycin B

This compound was prepared by the same procedure as described in Example I. From 14.4 g. (0.02 m.) of erythromycin B was obtained 15.7 g. of desired product. This material was purified by column chromatography to obtain an analytical sample. The analysis agreed with the desired product.

$C_{39}H_{69}NO_{14}S$; M.W. – 808.01.
Theory: C: 57.97; H: 8.61; N: 1.73.
Found: C: 57.85; H: 8.95; N: 1.66

EXAMPLE III

4''-O-(β-Dimethylaminoethyl)Sulfonyl Erythromycin B

To a glass liner, 3.23 g. (4.00 mM.) of 4''-O-vinylsulfonyl erythromycin B was added. The erythromycin was cooled in an ice bath to which 100 ml. of liquid dimethylamine was added slowly. The glass liner, containing this solution, was placed in a 270 ml. Hastelloy bomb, sealed and allowed to stand at room temperature for 80 hours. After this period of time, the bomb was vented and the excess dimethylamine evaporated. The solid which remained (3.25 g.) was purified by recrystallization from acetone to obtain an analytically pure sample. The analysis agreed with the desired product.

$C_{41}H_{76}N_2O_{14}S$; M.W. – 853.10; M.P. – 123° – 125° C.
Theory: C: 57.72; H: 8.98; N: 3.28.
Found: C: 57.36; H: 9.22; N: 3.06

EXAMPLE IV

4''-O-(β-Dimethylaminoethyl)Sulfonyl Erythromycin A

This compound was prepared by the same procedure as described in Example III. The analysis agreed with the desired product.

EXAMPLE V

4''-O-[β-(N-Methylpiperazino)Ethyl]Sulfonyl Erythromycin A

To a solution of 3.30 g. (4.00 mM.) of 4''-O-vinylsulfonyl erythromycin A in 50 ml. of dry benzene was added 5 ml. of N-methylpiperazine. The resultant solution was allowed to stand at room temperature overnight. After standing overnight, the reaction was diluted with 300 ml. of fresh benzene and this solution was washed with 200 ml. of $H_2O$, followed by washing with 200 ml. of 5% $NaHCO_3$ solution. The benzene solution was dried over $MgSO_4$, filtered and concentrated to leave 2.59 g. of a solid (formed by triturating with hexane). This solid was purified by recrystallization from isopropyl alcohol to obtain the analytically pure sample. The analysis agreed with the desired product.

$C_{44}H_{81}N_3O_{15}S$; M.W. – 924.18; M.P. 135° – 137° C.
Theory: C: 57.18; H: 8.83; N: 4.55.
Found: C: 57.13; H: 9.13; N: 4.50.

EXAMPLE VI

4''-O-[β-(N-Methylpiperazino)Ethyl]Sulfonyl Erythromycin B

This compound was prepared by the same procedure as described in Example V. From 3.23 g. (4.00 mM.) of 4''-O-vinylsulfonyl erythromycin B was obtained 2.20 g. of desired product by reacting the erythromycin with N-methylpiperazine. This product was purified by recrystallization from acetone to obtain an analytically pure sample. The analysis agreed with the desired product.

$C_{44}H_{81}N_3O_{14}S$; M.W. – 908.17; M.P. 128° – 132° C.
Theory: C: 58.19; H: 8.99; N: 4.63.
Found: C: 58.10; H: 9.24; N: 4.57.

EXAMPLE VII

4''-O-(β-morpholinoethyl)Sulfonyl Erythromycin A

This compound was prepared by the same procedure as described in Example V with the exception that morpholine was a reactant. This product was purified by column chromatography to obtain an analytically pure sample. The analysis agreed with the desired product.

$C_{43}H_{78}N_2O_{16}S$; M.W. – 911.13.
Theory: C: 56.68; H: 8.63; N: 3.08.
Found: C: 56.84; H: 8.89; N: 2.94.

EXAMPLE VIII

4''-O-(β-Morpholinoethyl)Sulfonyl Erythromycin B

This compound was prepared by the same procedure as described in Example VII. From 8.1 g. (0.01 m.) of 4''-O-vinylsulfonyl erythromycin B was obtained 7.90 g. of desired product. This material was purified by column chromatography to obtain an analytically pure sample. The analysis agreed with the desired product.

$C_{43}H_{78}N_2O_{15}S$; M.W. – 895.13.
Theory: C: 57.76; H: 8.74; N: 3.13.
Found: C: 57.68; H: 9.08; N: 2.98.

EXAMPLE IX

4''-O-(β-Thiamorpholinoethyl)Sulfonyl Erythromycin A

This compound was prepared by the same procedure as described in Example V with the exception that thiamorpholine was the starting material. From 4.12 g. (5.00 mM.) of 4''-O-vinylsulfonyl erythromycin A was obtained 4.06 g. of desired product. This material was purified by column chromatography to obtain an analytically pure material. The analysis agreed with the desired product.

$C_{43}H_{78}N_2O_{15}S_2$; M.W. – 929.20

EXAMPLE X

4''-O-(β-Thiamorpholinoethyl)Sulfonyl Erythromycin B

This compound is prepared by the same procedure as described in Example IX. From 4.04 g. (5.00 mM.) of 4''-O-vinylsulfonyl erythromycin B is obtained 3.70 g. of desired product. This material can be purified by column chromatography to obtain an analytically pure sample.

EXAMPLE XI

4''-O-(β-Aziridinoethyl)Sulfonyl Erythromycin A

This compound was prepared in the same manner as described in Example V with the exception that ethyleneimine was a reactant. From 4.12 g. (5.00 mM.) of 4''-O-vinylsulfonyl erythromycin A was obtained 2.96 g. of desired product. This product was purified by column chromatography to obtain an analytically pure sample. The analysis agreed with the desired product.
$C_{41}H_{74}N_2O_{15}S$; M.W. - 867.09

EXAMPLE XII 4''-O-(β-Aziridinoethyl)Sulfonyl Erythromycin B

This compound was prepared the same as described in Example XI. From 4.04 g. (5.00 mM.) of 4''-O-vinylsulfonyl erythromycin B was obtained 3.52 g. of desired product. This material was purified by column chromatography to obtain an analytically pure sample. The analysis agreed with the desired product.
$C_{41}H_{74}N_2O_{14}S$; M.W. - 851.09

EXAMPLE XIII

4''-O-(β-Methylthioethyl)Sulfonyl Erythromycin A

To a cooled solution of 16.48 g. (0.02 m.) of 4''-O-vinylsulfonyl erythromycin A in 250 ml. of benzene was added 1 ml. of dimethylcyclohexylamine and to that 9.6 g. (0.20 m.) of methylmercaptan (gas) which was dissolved in the solution. The reaction vessel was sealed and allowed to stand at room temperature overnight. After this period of time, the reaction vessel was placed under vacuum (water pump) to rid the reaction mixture of the excess mercaptan. The benzene solution was washed with 2 × 200 ml. portions of 15% NaOH solution and 2 × 300 ml. portions of $H_2O$. The organic layer was dried over $MgSO_4$, filtered and concentrated to leave 13.43 g. of desired product. This material was purified by column chromatography to obtain an analytically pure material. The analysis agreed with the desired product.
$C_{40}H_{73}NO_{15}S_2$; M.W. - 872.12
Theory: C: 55.08; H: 8.43: N: 1.60
Found: C: 55.35; H: 8.65; N: 1.67

EXAMPLE XIV

4''-O-(β-Methylthioethyl)Sulfonyl Erythromycin B

This compound is prepared the same as described in Example XIII. The product may be purified by column chromatography to obtain an analytically pure sample.

EXAMPLE XV

4''-O-(β-Methylsulfonylethyl)Sulfonyl Erythromycin A

To a stirred solution of 2.60 g. (3.00 mM.) of 4''-O-(β-methylthioethyl)sulfonyl erythromycin A in 90 ml. of methylene chloride was added 2.10 g. (0.012 m.) of m-chloroperbenzoic acid slowly and portionwise. After the addition, the solution was allowed to stir at room temperature overnight. After stirring, the solution was poured into 500 ml. of 5% $NaHCO_3$ solution to which was added 300 ml. of fresh methylene chloride. After the evolution of $CO_2$ had ceased, the layers were separated and the organic layer was washed with 200 ml. of 5% $NaHCO_3$ solution. The organic layer was dried over $MgSO_4$, filtered and concentrated to leave 2.80 g. 4''-O-(β-methylsulfonylethyl)sulfonyl erythromycin A N-oxide. This material was azeotroped with benzene (3 × 100 ml.) to insure full removal of any remaining methylene chloride. This material was then dissolved in 200 ml. of alcohol and using 1 g. 5% palladium on carbon was hydrogenated under 3 atmospheres of hydrogen pressure on a Parr shaker for 4 hours. After this period of time, the catalyst was removed by filtration and washed well with fresh alcohol. The filtrate was concentrated to leave a glass. The glass was dissolved in 300 ml. of chloroform and washed with 200 ml. of 5% $NaHCO_3$ solution. The organic layer was dried over $MgSO_4$, filtered and concentrated to leave 2.10 g. of desired product. This material was purified by column chromatography to obtain an analytically pure material. The analysis agreed with the desired product.
$C_{40}H_{73}NO_{17}S_2$; M.W. - 904.12.
Theory: C: 53.13; H: 8.14; N: 1.55.
Found C: 53.22; H: 8.37; N: 1.49.

EXAMPLE XVI

4''-O-(β-Methylsulfonylethyl)Sulfonyl Erythromycin B

This compound is prepared the same as described in Example XV. This material may be purified by column chromatography to obtain an analytically pure material.

EXAMPLE XVII 4''-O-(β-Phenylthioethyl)Sulfonyl Erythromycin A

This compound was prepared the same as described in Example XIII with the exception that phenylmercaptan was used as a reactant. From 4.12 g. (5.00 mM.) of 4''-O-vinylsulfonyl erythromycin A was obtained 2.45 g. of a crystalline product. This material was purified by recrystallization from acetone. M.P. - 123° –125° C. The analysis agreed with the desired product.
$C_{45}H_{75}NO_{15}S_2$; M.W. - 934.19.
Theory: C: 57.85; H: 8.09; N: 1.50.
Found: C: 57.29; H: 8.22; N: 1.53.

EXAMPLE XVIII

4''-O-(β-Phenylthioethyl)Sulfonyl Erythromycin B

This compound was prepared the same as described in Example XVII. From 6.59 g. (8.00 mM.) of 4''-O-vinylsulfonyl erythromycin B was obtained 4.56 g. of a crystalline product. This material was purified by recrystallization from acetone. M.P. - 120° – 123° C. The analysis agreed with the desired product.
$C_{45}H_{75}NO_{14}S_2$; M.W. - 918.19.
Theory: C: 58.86; H: 8.23; N: 1.53.
Found: C: 58.63; H: 8.40; N: 1.55.

EXAMPLE XIX

4''-O-(β-Phenylsulfonylethyl)Sulfonyl Erythromycin B

This compound was prepared in the same manner as described in Example XV by reacting the product of Example XVIII. From 2.80 g. (3.00 mM.) of 4''-O-(β-phenylthioethyl) sulfonyl erythromycin B was obtained 2.63 g. of desired product. This material was purified by recrystallization from acetone. M.P. - 152° – 155° C. (dec.) The analysis agreed with the desired product.
$C_{45}H_{75}NO_{16}S_2$; M.W. - 950.19.
Theory: C: 56.88; H: 7.96; N: 1.47.
Found: C: 56.92; H: 8.17; N: 1.35.

EXAMAPLE XX

4''-O-(β-Phenylsulfonylethyl)Sulfonyl Erythromycin A

This compound is prepared the same as described in Example XIX.

EXAMPLE XXI

4''-O-[β-(p-Chlorophenylthio)Ethyl]Sulfonyl Erythromycin A

This compound is prepared the same as described in

Example XIII with the exception that p-chlorophenylmercaptan is the reactant. From 3.30 g. (4.00 mM.) of 4''-O-vinylsulfonyl erythromycin A is obtained 3.10 g. of desired product.

EXAMPLE XXII

4''-O-[β-(p-Chlorophenylthio)Ethyl]Sulfonyl Erythromycin B

This compound was prepared the same as described in Example XXI. From 4.04 g. (5.00 mM.) of 4''-O-vinylsulfonyl erythromycin B was obtained 2.06 g. of a crystalline material. This solid was recrystallized from acetone. M.P. - 138°– 140° C. The analysis agreed with the desired product.

$C_{45}H_{74}ClNO_{14}S_2$; M.W. - 952.64.
Theory: C: 56.73; H: 7.83; N: 1.47.
Found: C: 56.49; H: 8.10; N: 1.39.

EXAMPLE XXIII

4''-O-[β-(p-Aminophenylthio)Ethyl]Sulfonyl Erythromycin A

This compound was prepared the same as described in Example XIII with the exception that p-aminophenylmercaptan was the reactant. From 3.30 g. (4.00 mM.) of 4''-O-vinylsulfonyl erythromycin A was obtained 2.82 g. of a crystalline material. This solid was recrystallized from acetone to obtain the pure product. M.P. - 140°- 143° C. The analysis agreed with the desired product.

$C_{45}H_{76}N_2O_{15}S_2$; M.W. - 949.22.

EXAMPLE XXIV

4''-O-[β-(p-Aminophenylthio)Ethyl]Sulfonyl Erythromycin B

This compound was prepared the same as described in Example XXIII. From 4.04 g. (5.00 mM.) of 4''-O-vinylsulfonyl erythromycin B was obtained 2.34 g. of a crystalline material. This solid was recrystallized from acetone to obtain the pure product. M.P. - 145°– 148° C. The analysis agreed with the desired product.

$C_{45}H_{76}N_2O_{14}S_2$; M.W. - 933.22.
Theory: C: 57.91; H: 8.21; N: 3.00.
Found: C: 58.05; H: 8.54; N: 2.85.

EXAMPLE XXV

4''-O-[β-(m-Aminophenylthio)Ethyl]Sulfonyl Erythromycin A

This compound was prepared the same as described in Example XIII with the exception that m-aminophenylmercaptan was employed. From 3.30 g. (4.00 mM.) of 4''-O-vinylsulfonyl erythromycin A was obtained 3.20 g. of a crystalline material. This solid was recrystallized from acetone to obtain the pure product. M.P. - 143°–146° C. The analysis agreed with the desired product.

EXAMPLE XXVI

4''-O-[β-(m-Aminophenylthio)Ethyl]Sulfonyl Erythromycin B

This compound is prepared the same as described in Example XXV.

EXAMPLE XXVII

4''-O-[β-(o-Aminophenylthio)Ethyl]Sulfonyl Erythromycin A

This compound is prepared the same as described in Example XIII with the exception that o-aminophenylmercaptan is employed. From 3.30 g. (4.00 mM.) of 4''-O-vinylsulfonyl erythromycin A may be obtained 3.08 g. of desired product. This material may be purified by column chromatography.

EXAMPLE XXVIII

4''-O[β-(o-Aminophenylthio)Ethyl]Sulfonyl Erythromycin B

This compound is prepared the same as described in Example XXVII. This material may be purified by column chromatography.

EXAMPLE XXIX

4''-O-[β-(p-Dimethylaminophenylthio)Ethyl]Sulfonyl Erythromycin A

This compound is prepared the same as described in Example XIII with the exception that p-dimethylaminophenylmercaptan is the reactant. This material may be purified by column chromatography.

EXAMPLE XXX

4''-O-[β-(p-Dimethylaminophenylthio)Ethyl]Sulfonyl Erythromycin B

This compound is prepared the same as described in Example XXIX.

EXAMPLE XXXI

4''-O-[β-(2,4-Dichlorophenylthio)Ethyl]Sulfonyl Erythromycin A

The compound is prepared the same as described in Example XIII with the exception that 2,4-dichlorophenylmercaptan is the reactant. This material may be purified by column chromatography.

EXAMPLE XXXII

4''-O-[β-(2,4-Dichlorophenylthio)Ethyl]Sulfonyl Erythromycin B

This compound is prepared the same as described in Example XXXI.

EXAMPLE XXXIII

4''-O-[β-(p-Tolylthio)Ethyl]Sulfonyl Erythromycin A

This compound is prepared the same as described in Example XIII with the exception that p-tolylmercaptan is the reactant.

EXAMPLE XXXIV

4''-O-]β-(p-Tolylthio)Ethyl]Sulfonyl Erythromycin B

This compound was prepared the same as described in Example XXXIII. From 4.04 g. (5.00 mM.) of 4''-O-vinylsulfonyl erythromycin B was obtained 2.05 g. of a crystalline material. This solid was recrystallized from acetone to obtain the pure product. M.P. - 140° – 143° C. The analysis agreed with the desired product.

$C_{46}H_{77}NO_{14}S_2$; M.W. - 932.19.
Theory: C: 59.26; H: 8.33; N: 1.50.
Found: C: 59.50; H: 8.65; N: 1.49.

EXAMPLE XXXV

4''-O-[β-(p-fluorophenylthio)Ethyl]Sulfonyl Erythromycin A

This compound was prepared the same as described in Example XIII with the exception that p-fluorophenylmercaptan is the reactant. The product was recrystallized from acetone to obtain a pure product. M.P. - 118°–120° C. The analysis agreed with the desired product.

$C_{45}H_{74}FNO_{15}S_2$; M.W. - 952.18.
Theory: C: 56.76; H: 7.83; N: 1.47.
Found: C: 56.61; H: 8.11; N: 1.51.

EXAMPLE XXXVI

4''-O-[β-(p-Fluorophenylthio)Ethyl]Sulfonyl Erythromycin B

This compound is prepared the same as described in Example XXXV.

EXAMPLE XXXVII

4''-O-[β-(p-Methoxyphenylthio)Ethyl]Sulfonyl Erythromycin A

This compound is prepared the same as described in Example XIII with the exception that p-methoxyphenylmercaptan is employed.

EXAMPLE XXXVIII

4''-O-[β-(p-Methoxyphenylthio)Ethyl]Sulfonyl Erythromycin B

This compound is prepared the same as described in Example XXXVII.

EXAMPLE XXXIX

4''-O-[β-(p-Hydroxyphenylthio)Ethyl]Sulfonyl Erythromycin A

This compound is prepared the same as described in Example XIII with the exception that p-hydroxyphenylmercaptan is employed.

EXAMPLE XL

4''-O-[β-(p-Hydroxyphenylthio)Ethyl]Sulfonyl Erythromycin B

This compound is prepared the same as described in Example XXXIX.

EXAMPLE XLI

4''-O-[β-(Pentafluorophenylthio)Ethyl]Sulfonyl Erythromycin A

This compound is prepared the same as described in Example XIII with the exception that pentafluorophenylmercaptan is a reactant.

EXAMPLE XLII

4''-O-[β-(Pentafluorophenylthio)Ethyl]Sulfonyl Erythromycin B

This compound is prepared the same as described in Example XLI.

EXAMPLE XLIII

4''-O-]β-(p-Trifluoromethylphenylthio)ethyl]Sulfonyl Erythromycin A

This compound is prepared the same as described in Example XIII with the exception that p-trifluoromethylphenylmercaptan is employed.

EXAMPLE XLIV

4''-O-[β-(p-Trifluoromethylphenylthio)Ethyl]Sulfonyl Erythromycin B

This compound is prepared the same as described in Example XLIII.

EXAMPLE XLV

4''-O-(β-Benzylthioethyl)Sulfonyl Erythromycin A

This compound is prepared the same as described in Example XIII with the exception that benzylmercaptan is a reactant.

EXAMPLE XLVI

4''-O-(β-Benzylthioethyl)Sulfonyl Erythromycin B

This compound is prepared the same as described in Example XLV.

EXAMPLE XLVII

4''-O-(β-Methoxyethyl)Sulfonyl Erythromycin A

To a solution of 8.24 g. (0.01 m.) of 4''-O-vinylsulfonyl erythromycin A dissolved in 100 ml. of methanol, 10 ml. of 5% NaHCO₃ solution was added and allowed to stir at room temperature for 14 days. After this period of time, this solution was poured into 500 ml. of H₂O and extracted with 2 × 300 ml. of chloroform. The extracts were combined, dried over MgSO₄, filtered and concentrated to leave 8.49 g. of desired product. This material was purified by column chromatography. The analysis agreed with the desired product.

$C_{40}H_{73}NO_{16}S$; M.W. - 856.05.
Theory: C: 56.12; H: 8.60; N: 1.64.
Found: C: 55.91; H: 8.84; N: 1.60.

EXAMPLE XLVIII

4''-O-(β-Methoxyethyl)Sulfonyl Erythromycin B

This compound was prepared the same as described in Example XLVII. From 8.10 g. (0.01 m.) of 4''-O-vinylsulfonyl erythromycin B was obtained 6.82 g. of desired product. This material was purified by column chromatography. The analysis agreed with the desired product.

$C_{40}H_{73}NO_{15}S$; M.W. - 840.05.
Theory: C: 57.19; H: 8.76; N: 1.67.
Found C: 57.54; H: 9.07; N: 1.40.

EXAMPLE XLIX

4''-O-β-(4-Acetanilino-1-Piperidino) Ethyl Sulfonyl Erythromycin A

This compound was prepared according to the procedure of Example V with the exception that 4-acetanilino-1-piperidine was the reactant. The analysis agreed with the desired product.

$C_{52}H_{87}N_3O_{16}S$; M.W. - 1042.30.

EXAMPLE L

4''-O-β-(4-Acetanilino-1-Piperidino) Ethyl Sulfonyl Erythromycin B

This compound was prepared according to the procedure of Example XLIX. The analysis agreed with the desired product. $C_{52}H_{87}N_3O_{15}S$; M.W. - 1026.30.
Theory: C: 60.85; H: 8.55; N: 4.09.
Found: C: 61.27; H: 8.54; N: 3.66.

EXAMPLE LI

4''-O-(β-Piperidinoethyl)Sulfonyl Erythromycin B

This compound was prepared according to the procedure of Example VIII with the exception that piperidine was the starting reactant. The analysis agreed with the desired product.

$C_{44}H_{80}N_2O_{14}S$; M.W. - 893.16.

Theory: C: 59.17; H: 9.08; N: 3.14.

Found: C: 59.12; H: 9.23; N: 3.09.

Representative erythromycin derivatives here were tested for their antibiotic activity both in vivo and in vitro. To test the compounds in vivo mice were injected with *Staphylococcus aureus* Smith and various dosages of the antibiotic administered to treat the infection. All infected mice which were not treated died, whereas varying percentages of mice also treated with antibiotic survived as shown below.

The compounds were also tested in vitro against a variety of gram negative and gram positive bacteria. Figures given below are MIC values in terms of mcg./ml.

A wide variety of organisms were used to test the in vitro activity of the compounds here. These are as follows:

1. *Staphylococcus aureus* 9144
2. *Staphylococcus aureus* Smith
3. *Staphylococcus aureus* Smith ER
4. *Staphylococcus aureus* Quinones
5. *Staphylococcus aureus* Wise 155
6. *Streptococcus faecalis* 10541
7. *Escherichia coli* Juhl
8. *Klebsiella pneumoniae* 10031
9. *Proteus vulgaris* Abbot JJ
10. *Proteus mirabilis* Finland No. 9
11. *Salmonella typhimurium* Ed No. 9
12. *Shigella sonnei* 9290
13. *Pseudomonas aeruginosa* BMH No. 10
14. *Streptococcus pyogenes* Roper
15. *Streptococcus pyogenes* Scott
16. *Haemophilus influenzae* 9334
17. *Haemophilus influenzae* Brimm CSF
18. *Haemophilus influenzae* Illinois
19. *Haemophilus influenzae* Patterson
20. *Haemophilus influenzae* Shemwell
21. *Haemophilus influenzae* Terry
22. *Myco. gallisepticum* S6
23. *Myco. granularum* 19168
24. *Myco. hyorhinis* 17981
25. *Myco. pneumoniae* FH
26. *Trichomonas vaginalis* CIMl
27. *Crithidia Fasciculata*
28. *Staphylococcus aureus* 209P ER
29. *Staphylococcus aureus* MIH No. 7
30. *Staphylococcus aureus* Wise J. 66
31. *Staphylococcus aureus* Wise J. 348
32. *Staphylococcus aureus* Wise J. 419
33. *Staphylococcus aureus* Wise J. 645
34. *Diplococcus pneumoniae* Dixon 23

Results of in vivo testing are as follows. All antibiotic compounds of the invention were administered orally.

TABLE I

| Example No. | Dosage mg./kg. - Percent Survival | | |
|---|---|---|---|
| | 300 | 150 | 75 |
| III | 70 | 20 | 0 |
| V | 50 | 0 | 0 |
| VI | 30 | 30 | 0 |
| VII | 60 | 20 | 0 |
| VIII | 90 | 50 | 0 |
| XI | 60 | 20 | 0 |
| XII | 70 | 20 | 0 |
| XVII | 50 | 0 | 0 |
| XVIII | 50 | 0 | 0 |
| XIX | 80 | 0 | 0 |
| XXII | 90 | 0 | 0 |
| XXIV | 100 | 0 | 0 |
| XXXIV | 50 | 0 | 0 |
| XLVII | 60 | 20 | 0 |
| XLVIII | 80 | 0 | 0 |

TABLE II

| Organism No. | EXAMPLE III MIC |
|---|---|
| 1 | 1.56 |
| 2 | 1.56 |
| 3 | >100 |
| 4 | >100 |
| 5 | >100 |
| 6 | .39 |
| 7 | >100 |
| 8 | 25 |
| 9 | >100 |
| 10 | >100 |
| 11 | >100 |
| 12 | >100 |
| 13 | >100 |
| 14 | >100 |
| 15 | >100 |
| 16 | 100 |
| 17 | 25 |
| 18 | 50 |
| 19 | 100 |
| 20 | 100 |
| 21 | 100 |
| 22 | .10 |
| 23 | 25 |
| 24 | 100 |
| 25 | .25 |
| 26 | >100 |
| 27 | >100 |

TABLE III

| Organism No. | EXAMPLE V MIC |
|---|---|
| 1 | 3.1 |
| 2 | 3.1 |
| 3 | >100 |
| 4 | >100 |
| 5 | >100 |
| 6 | .39 |
| 7 | >100 |
| 8 | 25 |
| 9 | >100 |
| 10 | >100 |
| 11 | >100 |
| 12 | >100 |
| 13 | >100 |
| 14 | >100 |
| 15 | >100 |
| 16 | 50 |
| 17 | 25 |
| 18 | 25 |
| 19 | 25 |
| 20 | 25 |
| 21 | 25 |
| 22 | .10 |
| 23 | .05 |
| 24 | >100 |
| 25 | .05 |
| 26 | >100 |

TABLE III-Continued

EXAMPLE V

| Organism No. | MIC |
|---|---|
| 27 | >100 |
| 4 | 12.5 |
| 5 | 6.2 |
| 2 | .78 |
| 28 | 12.5 |
| 3 | >100 |
| 29 | 6.2 |
| 30 | 6.2 |
| 31 | 12.5 |
| 32 | 6.2 |
| 33 | 6.2 |
| 34 | 100 |

TABLE IV

EXAMPLE VI

| Organism No. | MIC |
|---|---|
| 1 | 6.2 |
| 2 | 6.3 |
| 3 | >100 |
| 4 | 50 |
| 5 | 25 |
| 6 | 1.56 |
| 7 | >100 |
| 8 | 50 |
| 9 | >100 |
| 10 | >100 |
| 11 | >100 |
| 12 | >100 |
| 13 | >100 |
| 14 | >100 |
| 15 | >100 |
| 16 | 100 |
| 17 | 50 |
| 18 | 100 |
| 19 | 50 |
| 20 | 50 |
| 21 | 100 |
| 22 | .01 |
| 23 | .10 |
| 24 | >100 |
| 25 | .05 |
| 26 | >100 |
| 27 | >100 |

TABLE V

EXAMPLE VII

| Organism No. | MIC |
|---|---|
| 1 | .78 |
| 2 | .78 |
| 3 | >100 |
| 4 | 100 |
| 5 | 50 |
| 6 | .2 |
| 7 | >100 |
| 8 | 50 |
| 9 | >100 |
| 10 | >100 |
| 11 | >100 |
| 12 | >100 |
| 13 | >100 |
| 14 | >100 |
| 15 | >100 |
| 16 | 25 |
| 17 | 12.5 |
| 18 | 12.5 |
| 19 | 12.5 |
| 20 | 12.5 |
| 21 | 12.5 |
| 22 | .05 |
| 23 | .05 |
| 24 | >100 |
| 25 | .05 |
| 26 | >100 |
| 27 | >100 |

TABLE VI

EXAMPLE VIII

| Organism No. | MIC |
|---|---|
| 1 | .78 |
| 2 | .78 |
| 3 | >100 |
| 4 | 12.5 |
| 5 | 12.5 |
| 6 | .39 |
| 7 | >100 |
| 8 | 50 |
| 9 | >100 |
| 10 | >100 |
| 11 | >100 |
| 12 | >100 |
| 13 | >100 |
| 14 | >100 |
| 15 | >100 |
| 16 | 50 |
| 17 | 50 |
| 18 | 25 |
| 19 | 50 |
| 20 | 25 |
| 21 | 25 |
| 22 | .05 |
| 23 | .05 |
| 24 | >100 |
| 25 | .10 |
| 26 | >100 |
| 27 | >100 |
| 4 | 12.5 |
| 5 | 6.2 |
| 2 | .78 |
| 28 | 12.5 |
| 3 | >100 |
| 29 | 6.2 |
| 30 | 6.2 |
| 31 | 12.5 |
| 32 | 6.2 |
| 33 | 6.2 |
| 34 | 100 |

TABLE VII

EXAMPLE XI

| Organism No. | MIC |
|---|---|
| 1 | .78 |
| 2 | .78 |
| 3 | >100 |
| 4 | 50 |
| 5 | 25 |
| 6 | .10 |
| 7 | >100 |
| 8 | 25 |
| 9 | >100 |
| 10 | >100 |
| 11 | >100 |
| 12 | >100 |
| 13 | >100 |
| 14 | >100 |
| 15 | >100 |
| 16 | 25 |
| 17 | 12.5 |
| 18 | 12.5 |
| 19 | 25 |
| 20 | 25 |
| 21 | 25 |
| 22 | .05 |
| 23 | .05 |
| 24 | 2.5 |
| 25 | .02 |
| 26 | >100 |
| 27 | >100 |

TABLE VIII

EXAMPLE XII

| Organism No. | MIC |
|---|---|
| 1 | .78 |
| 2 | .78 |
| 3 | >100 |

TABLE VIII-Continued

EXAMPLE XII

| Organism No. | MIC |
|---|---|
| 4 | 12.5 |
| 5 | 12.5 |
| 6 | .05 |
| 7 | >100 |
| 8 | 25 |
| 9 | >100 |
| 10 | >100 |
| 11 | 100 |
| 12 | 100 |
| 13 | >100 |
| 14 | >100 |
| 15 | >100 |
| 16 | 25 |
| 17 | 6.2 |
| 18 | 6.2 |
| 19 | 6.2 |
| 20 | 6.2 |
| 21 | 6.2 |
| 22 | .02 |
| 23 | .05 |
| 24 | 2.5 |
| 25 | .02 |
| 26 | >100 |
| 27 | >100 |
| 4 | 12.5 |
| 5 | 12.5 |
| 2 | .78 |
| 28 | 25 |
| 3 | >100 |
| 29 | 25 |
| 30 | 12.5 |
| 31 | 25 |
| 32 | 12.5 |
| 33 | 25 |

TABLE IX

EXAMPLE XVII

| Organism No. | MIC |
|---|---|
| 1 | .39 |
| 2 | .20 |
| 3 | >100 |
| 4 | .78 |
| 5 | .78 |
| 6 | .10 |
| 7 | >100 |
| 8 | 6.2 |
| 9 | >100 |
| 10 | >100 |
| 11 | 50 |
| 12 | 50 |
| 13 | >100 |
| 14 | >100 |
| 15 | >100 |
| 16 | 12.5 |
| 17 | 3.1 |
| 18 | 3.1 |
| 19 | 3.1 |
| 20 | 3.1 |
| 21 | 6.2 |
| 22 | .02 |
| 23 | .20 |
| 24 | 25 |
| 25 | .05 |
| 26 | >100 |
| 27 | 50 |
| 4 | .78 |
| 5 | .78 |
| 2 | .20 |
| 28 | .78 |
| 3 | 100 |
| 29 | .78 |
| 30 | .78 |
| 31 | .78 |
| 32 | .78 |
| 33 | .78 |

TABLE X

EXAMPLE XVIII

| Organism No. | MIC |
|---|---|
| 1 | .39 |
| 2 | .39 |
| 3 | >100 |
| 4 | .78 |
| 5 | .78 |
| 6 | .05 |
| 7 | >100 |
| 8 | 6.2 |
| 9 | >100 |
| 10 | >100 |
| 11 | 50 |
| 12 | 50 |
| 13 | >100 |
| 14 | 100 |
| 15 | 100 |
| 16 | 25 |
| 17 | 6.2 |
| 18 | 12.5 |
| 19 | 12.5 |
| 20 | 6.2 |
| 21 | 6.2 |
| 22 | .01 |
| 23 | .10 |
| 24 | 25 |
| 25 | .05 |
| 26 | >100 |
| 27 | 100 |
| 4 | .78 |
| 5 | .78 |
| 2 | .20 |
| 28 | .78 |
| 3 | >100 |
| 29 | .78 |
| 30 | .39 |
| 31 | .78 |
| 32 | .78 |
| 33 | .78 |

TABLE XI

EXAMPLE XIX

| Organism No. | MIC |
|---|---|
| 1 | .78 |
| 2 | .78 |
| 3 | >100 |
| 4 | >100 |
| 5 | >100 |
| 6 | .20 |
| 7 | >100 |
| 8 | 12.5 |
| 9 | >100 |
| 10 | >100 |
| 11 | >100 |
| 12 | 100 |
| 13 | >100 |
| 14 | >100 |
| 15 | >100 |
| 16 | 25 |
| 17 | 12.5 |
| 18 | 6.2 |
| 19 | 6.2 |
| 20 | 6.2 |
| 21 | 6.2 |
| 22 | .25 |
| 23 | .25 |
| 24 | >100 |
| 25 | .02 |
| 26 | >100 |
| 27 | >100 |

TABLE XII

EXAMPLE XXII

| Organism No. | MIC |
|---|---|
| 1 | .39 |
| 2 | .39 |
| 3 | >100 |
| 4 | 1.56 |
| 5 | .78 |

TABLE XII-Continued

EXAMPLE XXII

| Organism No. | MIC |
|---|---|
| 6 | .39 |
| 7 | >100 |
| 8 | 25 |
| 9 | >100 |
| 10 | >100 |
| 11 | >100 |
| 12 | >100 |
| 13 | >100 |
| 14 | 50 |
| 15 | 100 |
| 16 | 100 |
| 17 | 25 |
| 18 | 25 |
| 19 | 25 |
| 20 | 25 |
| 21 | 25 |
| 22 | .05 |
| 23 | .25 |
| 24 | 100 |
| 25 | .10 |
| 26 | >100 |
| 27 | 100 |
| 4 | .78 |
| 5 | .78 |
| 2 | .39 |
| 28 | .78 |
| 3 | >100 |
| 29 | 1.56 |
| 30 | 1.56 |
| 31 | 1.56 |
| 32 | 1.56 |
| 33 | 1.56 |

TABLE XIII

EXAMPLE XXIV

| Organism No. | MIC |
|---|---|
| 1 | .39 |
| 2 | .39 |
| 3 | >100 |
| 4 | 25 |
| 5 | 25 |
| 6 | .02 |
| 7 | >100 |
| 8 | 12.5 |
| 9 | >100 |
| 10 | >100 |
| 11 | 100 |
| 12 | 100 |
| 13 | >100 |
| 14 | >100 |
| 15 | >100 |
| 16 | 25 |
| 17 | 12.5 |
| 18 | 12.5 |
| 19 | 12.5 |
| 20 | 12.5 |
| 21 | 12.5 |
| 22 | .02 |
| 23 | 1.0 |
| 24 | 5.0 |
| 25 | .05 |
| 26 | >100 |
| 27 | >100 |

TABLE XIV

EXAMPLE XXXIV

| Organism No. | MIC |
|---|---|
| 1 | .78 |
| 2 | .78 |
| 3 | >100 |
| 4 | 25 |
| 5 | 25 |
| 6 | .39 |
| 7 | >100 |
| 8 | >100 |
| 9 | >100 |
| 10 | >100 |
| 11 | >100 |

TABLE XIV-Continued

EXAMPLE XXXIV

| Organism No. | MIC |
|---|---|
| 12 | >100 |
| 13 | >100 |
| 14 | >100 |
| 15 | >100 |
| 16 | >100 |
| 17 | 50 |
| 18 | 25 |
| 19 | 50 |
| 20 | 50 |
| 21 | 50 |
| 22 | .25 |
| 23 | 2.5 |
| 24 | 50 |
| 25 | 1.0 |
| 26 | >100 |
| 27 | 25 |

TABLE XV

EXAMPLE XLVII

| Organism No. | MIC |
|---|---|
| 1 | .39 |
| 2 | .39 |
| 3 | >100 |
| 4 | 3.1 |
| 5 | 3.1 |
| 6 | .39 |
| 7 | >100 |
| 8 | 25 |
| 9 | >100 |
| 10 | >100 |
| 11 | >100 |
| 12 | >100 |
| 13 | >100 |
| 14 | >100 |
| 15 | >100 |
| 16 | 50 |
| 17 | 12.5 |
| 18 | 25 |
| 19 | 25 |
| 20 | 12.5 |
| 21 | 25 |
| 22 | .1 |
| 23 | .25 |
| 24 | 25 |
| 25 | .05 |
| 26 | >100 |
| 27 | >100 |
| 4 | 3.1 |
| 5 | 3.1 |
| 2 | .78 |
| 28 | 3.1 |
| 3 | >100 |
| 29 | 3.1 |
| 30 | 3.1 |
| 31 | 3.1 |
| 32 | 3.1 |
| 33 | 6.2 |
| 34 | 50 |

TABLE XVI

EXAMPLE XLVIII

| Organism No. | MIC |
|---|---|
| 1 | 3.1 |
| 2 | 3.1 |
| 3 | >100 |
| 4 | 25 |
| 5 | 25 |
| 6 | .78 |
| 7 | >100 |
| 8 | 50 |
| 9 | >100 |
| 10 | >100 |
| 11 | >100 |
| 12 | >100 |
| 13 | >100 |
| 14 | >100 |
| 15 | >100 |
| 16 | 100 |

TABLE XVI-Continued

EXAMPLE XLVIII

| Organism No. | MIC |
|---|---|
| 17 | 50 |
| 18 | 100 |
| 19 | 100 |
| 20 | 50 |
| 21 | 50 |
| 22 | .05 |
| 23 | 1.0 |
| 24 | 100 |
| 25 | .10 |
| 26 | >100 |
| 27 | >100 |

TABLE XVII

EXAMPLE XLIX

| Organism No. | MIC |
|---|---|
| 1 | .39 |
| 2 | .20 |
| 3 | >100 |
| 4 | 3.1 |
| 5 | 1.56 |
| 6 | .39 |
| 7 | >100 |
| 8 | 50 |
| 9 | >100 |
| 10 | >100 |
| 11 | >100 |
| 12 | >100 |
| 13 | >100 |
| 14 | >100 |
| 15 | >100 |
| 16 | 25 |
| 17 | 12.5 |
| 18 | 12.5 |
| 19 | 12.5 |
| 20 | 12.5 |
| 21 | 12.5 |
| 22 | .02 |
| 23 | .25 |
| 24 | 50 |
| 25 | .05 |
| 26 | >100 |
| 27 | >100 |
| 4 | 1.56 |
| 5 | 1.56 |
| 2 | .20 |
| 28 | 3.1 |
| 3 | >100 |
| 29 | 1.56 |
| 30 | 1.56 |
| 31 | 1.56 |
| 32 | 1.56 |
| 33 | 1.56 |

TABLE XVIII

EXAMPLE L

| Organism No | MIC |
|---|---|
| 1 | .78 |
| 2 | .78 |
| 3 | >100 |
| 4 | >100 |
| 5 | >100 |
| 6 | .78 |
| 7 | >100 |
| 8 | 50 |
| 9 | >100 |
| 10 | >100 |
| 11 | >100 |
| 12 | >100 |
| 13 | >100 |
| 14 | >100 |
| 15 | >100 |
| 16 | 25 |
| 17 | 12.5 |
| 18 | 25 |
| 19 | 12.5 |
| 20 | 12.5 |
| 21 | 12.5 |
| 22 | .02 |

TABLE XVIII-Continued

EXAMPLE L

| Organism No | MIC |
|---|---|
| 23 | .25 |
| 24 | 50 |
| 25 | .02 |
| 26 | >100 |
| 27 | >100 |

The compounds of the invention here are useful as antibiotics when administered to warm-blooded animals at a preferred dosage of 25 – 2000 mg./kg. of body weight daily to treat infections in which one of the above or another susceptible bacterial organisms in the causative agent. More often the dosage is 75 – 1000 mg./kg.

Although administration is possible by the intraperitoneal route wherein the dose is dissolved or suspended in an inert physiologically harmless agent such as aqueous tragacanth, the preferred route is oral, either in capsule or tablet form. Capsules can, in addition to the active erythromycin also contain inert fillers such as lactose.

Tablets are made in the useful manner on tableting presses, and although the active compounds may be tableted along, it is preferred that a release agent such as magnesium stearate to aid in freeing the tablets from the machine dies during manufacture, together with a binder such as starch to assure good particle cohesion are included in a blend of active ingredient and diluents prior to tableting. After tableting, the tablets can be coated if desired. A preferred blend for tableting is as follows:

| | Percent |
|---|---|
| Erythromycin Compound | 77 |
| Magnesium stearate | 2 |
| Starch powder | 21 |

We claim:

1. An erthromycin compound having the formula:

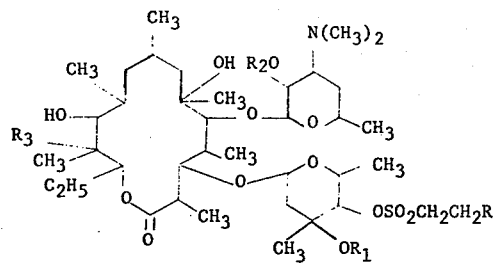

where R contains at least one alkyl group containing 1–6 carbon atoms and is selected from the group consisting of amino, mono, alkyl amino, dialkyl amino, alkoxy, morpholino, piperazino, piperidino, alkylthio, alkylsulfonyl, phenylthio, phenylsulfonyl thiamorpholino, aziridino, benzylthio, thiamorpholinosulfone, benzylsulfinyl, phenylsulfinyl, benzylsulfonyl, chloroalkyl, fluoroalkyl, cyanoalkyl, chlorocyanoalkyl, fluorocyanoalkyl, benzylamino, benzoxy, and benzylcyano; $R_1$ is methyl, $R_2$ is hydrogen or loweralkanoyl, and $R_3$ is hydrogen or hydroxy.

2. The derivative of claim 1 wherein R is dialkyl amino and $R_3$ is hydrogen.

3. The derivative of claim 1 wherein R is methoxy and $R_3$ is hydroxy.

4. The derivative of claim 1 wherein R is methoxy and $R_3$ is hydrogen.

5. The derivative of claim 1 wherein R is morpholino and $R_3$ is hydrogen.

6. The derivative of claim 1 wherein R is morpholino and $R_3$ is hydroxy.

7. The derivative of claim 1 wherein R is N-methylpiperazino and $R_3$ is hydroxy.

8. The derivative of claim 1 wherein R is N-methylpiperazino and $R_3$ is hydrogen.

9. The derivative of claim 1 wherein R is methylthio and $R_3$ is hydroxy.

10. The derivative of claim 1 wherein R is methylsulfonyl and $R_3$ is hydroxy.

11. The derivative of claim 1 wherein R is 4-acetanilino-1-piperidino and $R_3$ is hydroxy.

12. The derivative of claim 1 wherein R is 4-acetanilino-1-piperidino and $R_3$ is hydrogen.

13. The derivative of claim 1 wherein R is phenylthio and $R_3$ is hydrogen.

14. The derivative of claim 1 wherein R is phenylthio and $R_3$ is hydroxy.

15. The derivative of claim 1 wherein R is phenylsulfonyl and $R_3$ is hydrogen.

16. The derivative of claim 1 wherein R is thiamorpholino and $R_3$ is hydroxy.

17. The derivative of claim 1 wherein R is aziridino and $R_3$ is hydroxy.

18. The derivative of claim 1 wherein R is aziridino and $R_3$ is hydrogen.

19. The derivative of claim 1 wherein R is p-tolylthio and $R_3$ is hydrogen.

20. The derivative of claim 1 wherein R is p-aminophenylthio and $R_3$ is hydroxy.

21. The derivative of claim 1 wherein R is p-aminophenylthio and $R_3$ is hydrogen.

22. The derivative of claim 1 wherein R is p-chlorophenylthio and $R_3$ is hydrogen.

23. The derivative of claim 1 wherein R is p-fluorophenylthio and $R_3$ is hydroxy.

24. The derivative of claim 1 wherein R is piperidino and $R_3$ is hydrogen.

* * * * *

UNITED STATES PATENT OFFICE
CERTIFICATE OF CORRECTION

PATENT NO. : 3,884,902
DATED : May 20, 1975
INVENTOR(S) : Robert Hallas, Jerry Roy Martin, John Soloman Tadanier It is certified that error appears in the above-identified patent and that said Letters Patent are hereby corrected as shown below:

Front page, first column, under "Inventors:..." the name "John Soloman" should be corrected to read: --John Soloman Tadanier--.

Signed and Sealed this twenty-third Day of December 1975

[SEAL]

Attest:

RUTH C. MASON
*Attesting Officer*

C. MARSHALL DANN
*Commissioner of Patents and Trademarks*